United States Patent
Osborne

(10) Patent No.: US 11,206,211 B2
(45) Date of Patent: *Dec. 21, 2021

(54) STITCHING LABEL-SWITCHED PATHS BETWEEN AUTONOMOUS SYSTEMS WITH INTERNET PROTOCOL ROUTING

(71) Applicant: Level 3 Communications, LLC, Broomfield, CO (US)

(72) Inventor: Eric Osborne, Sutton, MA (US)

(73) Assignee: Level 3 Communications, LLC, Broomfield, CO (US)

( * ) Notice: Subject to any disclaimer, the term of this patent is extended or adjusted under 35 U.S.C. 154(b) by 14 days.

This patent is subject to a terminal disclaimer.

(21) Appl. No.: 16/861,277

(22) Filed: Apr. 29, 2020

(65) Prior Publication Data

US 2020/0259742 A1 Aug. 13, 2020

Related U.S. Application Data

(63) Continuation of application No. 16/102,243, filed on Aug. 13, 2018, now Pat. No. 10,644,997.

(60) Provisional application No. 62/545,282, filed on Aug. 14, 2017.

(51) Int. Cl.
*H04L 12/723* (2013.01)
*H04L 12/715* (2013.01)
*H04L 12/741* (2013.01)

(52) U.S. Cl.
CPC .............. *H04L 45/50* (2013.01); *H04L 45/04* (2013.01); *H04L 45/745* (2013.01)

(58) Field of Classification Search
CPC ........ H04L 45/04; H04L 45/50; H04L 45/745
See application file for complete search history.

(56) References Cited

U.S. PATENT DOCUMENTS

| | | |
|---|---|---|
| 7,424,019 B1 | 9/2008 | Kopelman |
| 7,489,695 B1 | 2/2009 | Ayyangar |
| 8,571,029 B1 | 10/2013 | Aggarwal |
| 9,049,142 B1* | 6/2015 | Osborne ................. H04L 45/50 |
| 9,692,692 B1* | 6/2017 | Vairavakkalai ........ H04L 45/025 |
| 9,781,030 B1* | 10/2017 | Torvi ...................... H04L 45/22 |
| 10,027,587 B1 | 7/2018 | O'Brien |
| 2009/0141721 A1* | 6/2009 | Filsfils .................... H04L 45/00 370/392 |
| 2010/0124231 A1* | 5/2010 | Kompella ............... H04L 45/04 370/401 |
| 2010/0265948 A1 | 10/2010 | Patel |

(Continued)

*Primary Examiner* — Chi H Pham
*Assistant Examiner* — Vladislav Y Agureyev

(57) ABSTRACT

Systems and methods for routing traffic through a network along Label-Switched Paths (LSPs) that may extend across multiple autonomous systems include performing Internet Protocol (IP) routing lookups as a packet is transmitted along the LSP. In one implementation, a packet having a predetermined value (which may be inserted by an upstream network device) is received at a network device after travelling along a first segment of an LSP. In response to identifying the predetermined label value of the packet, the network device may perform an IP routing lookup using IP routing information included in the packet to identify a next hop for the packet. The network device may then update a label of the packet such that the packet is routed along a second segment of the LSP and transmit the communication packet to the next hop.

20 Claims, 6 Drawing Sheets

(56) References Cited

U.S. PATENT DOCUMENTS

| | | |
|---|---|---|
| 2011/0032843 A1 | 2/2011 | Papp |
| 2011/0128969 A1 | 6/2011 | Scholl |
| 2012/0069745 A1 | 3/2012 | Kini |
| 2013/0031271 A1 | 1/2013 | Bosch |
| 2013/0155845 A1 | 6/2013 | Patel |
| 2014/0359275 A1* | 12/2014 | Murugesan ......... H04L 63/0428 713/153 |
| 2017/0339037 A1 | 11/2017 | Cheh |
| 2018/0351882 A1 | 12/2018 | Jeganathan |
| 2019/0007503 A1 | 1/2019 | Zmijewski |
| 2019/0052561 A1 | 2/2019 | Osborne |

* cited by examiner

STITCHING LABEL-SWITCHED PATHS BETWEEN AUTONOMOUS SYSTEMS WITH INTERNET PROTOCOL ROUTING

TECHNICAL FIELD

Embodiments of the present invention generally relate to systems and methods for implementing a telecommunications network and more specifically for utilizing Internet Protocol routing within a Label-Switched Path stitched across two or more Autonomous System networks.

BACKGROUND

Telecommunication networks provide for the transmission of information across some distance through terrestrial, wireless or satellite communication networks. Such communications may involve voice, data or multimedia information, among others. In addition, telecommunication networks often offer features and/or services to the customers of the network that provide flexible and varied ways in which the communications are transmitted over the network. For example, some telecommunication networks may communicate with other networks or otherwise transfer communication packets with other networks to reach a destination communication device. However, it is often the case that one network does not have all of the relevant routing information for the connected network such that routing of communication packets through the two networks is not done in an efficient or cost-effective manner. Rather, through the routing protocols shared between the networks and the lack of network topology information, packets are delivered to the destination device or network at an operational cost to a network operator.

It is with these observations in mind, among others, that aspects of the present disclosure were conceived.

SUMMARY

The present disclosure is directed to systems and methods for routing traffic through a network. Among other things, such systems and methods facilitate efficient communication along Label-Switched Paths (LSPs) that may extend across multiple autonomous systems. In aspects of the present disclosure, "stitching" of an LSP is accomplished by performing at least one Internet Protocol (IP) routing lookup as a packet is transmitted along the LSP. For example, in one implementation, the packet is received from an egress autonomous system border router (ASBR) of a first autonomous system (AS) by an ingress ASBR of a second AS after travelling along a first segment of an LSP. The ingress ASBR may then perform the IP routing lookup to identify an edge or similar device to which the packet may be routed most efficiently. The ingress ASBR may then update a label of the packet such that the packet is routed along a second segment of the LSP to the edge device. In certain implementations, the ingress ASBR performs the IP routing lookup in response to receiving a packet having a predetermined label value, such as a null or zero value.

Although other aspects of the present disclosure are described below, in one aspect of the present disclosure, a method of routing traffic through a network is provided. The method includes receiving, at a routing device of an AS, a communication packet including IP routing information and a label value associated with a destination network device. The routing device replaces the label value associated with the destination network device with a predetermined label value, such as a null or zero value, and transmits the communication packet with the predetermined label value to an ASBR in communication with the routing device. The predetermined label value is selected to cause the ASBR to perform a routing lookup using the IP routing information and to route the communication packet based on a result of the routing lookup.

In one example implementation, the routing device may be an egress ASBR of a first AS and the ASBR may be an ingress ASBR of a second AS such that the method results in the transmission of data between autonomous systems. In another implementation, each of the routing device and the ASBR may be elements of the same AS such that the ASBR is an egress device of the AS.

In another aspect of the present disclosure, another method of routing traffic through a network is provided. The method includes receiving a communication packet at an ASBR of an AS, the communication packet including IP routing information and a predetermined label value. In response to the ASBR identifying the predetermined label value, the ASBR performs a routing lookup using the IP routing information and a routing table of the ASBR to identify a next hop for routing of the communication packet. The ASBR then routes the communication packet based on the result of the routing lookup.

Routing by the ASBR may include one of IP-based or LSP-based routing. For example, in one implementation, the ASBR is an egress ASBR of the AS such that the ASBR performs IP-based routing to an ingress ASBR of a second AS. In another implementation, the ASBR may be an ingress ASBR of the AS such that the ASBR initiates LSP-based routing by inserting a label value associated with the network device to receive the communication packet and routing the packet accordingly.

In yet another aspect of the present disclosure, a system for routing traffic through a network is provided. The system includes a network device of a first AS and an ingress ASBR of a second AS in communication with the network device. The network device is configured to receive a communication packet including IP routing information and a first label value and to replace the first label value with a predetermined label value. The ingress ASBR is configured to, in response to receiving the communication packet having the predetermined label value, perform an ingress ASBR routing lookup using the IP routing information and a routing table of the ingress ASBR to identify an edge device of the network. The ingress ASBR is further configured to replace the predetermined label with a second label value associated with the edge device.

DETAILED DESCRIPTION

Figure 1:
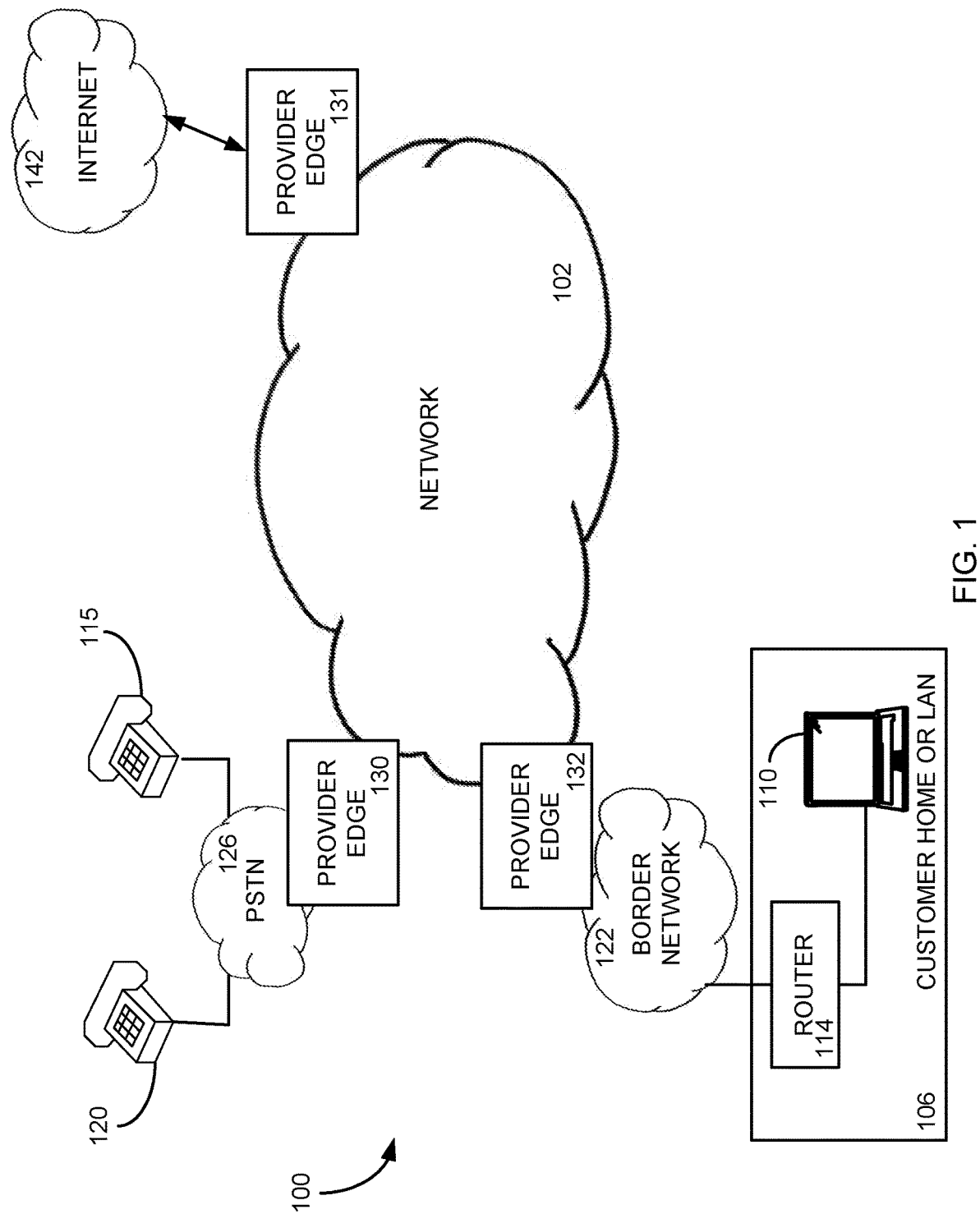
FIG. 1 is a schematic diagram illustrating an exemplary Voice over Internet Protocol (VoIP) operating environment in accordance with one embodiment.

Aspects of the present disclosure involve systems and methods for utilizing Internet Protocol (IP) routing within a Label-Switched Path (LSP) extending across two or more Autonomous System (AS) networks. Conventionally, LSPs are limited to a single AS network and, as a result, are generally bound by the extent of the AS network through which the LSP extends. However, two or more AS networks may be "stitched" together such that they may be managed as one collective telecommunication network. Stitching generally involves functionality by which traffic transmitted along a first LSP route through a first AS is passed to a second AS for transmission along a second LSP route extending through the second AS. In other words, by providing communication between the first LSP route and the second LSP route the two networks are "stitched" together. The first LSP route and the second LSP route are effectively combined into a single LSP route extending through each of the first and second AS networks.

In more detail and in one example, an LSP route through the two AS networks may be created from an ingress edge device in the first AS network to an egress edge device of the second AS network utilizing one or more Multiprotocol Label Switching (MPLS) routing techniques within each of the AS networks. In this manner, a communication packet received at the ingress edge device of the first AS network may utilize label routing of the communication to reach the egress edge device of the second AS network for connection or delivery to a destination communication device reachable from the egress edge. Stitching may be implemented in any context in which LSP routes are to be established across multiple AS networks. For example, stitching may be particularly useful when a telecommunications company or network administrator operating a first AS network merges with a second telecommunications company or otherwise acquires a second AS network.

One potential issue with the LSP route through the two AS networks is that some of the network devices along the route may lack network topology information such that a received packet is not routed most efficiently between network devices within the networks. Thus, in one implementation, one or more components along the LSP route may be configured to route based on an IP routing table to adjust the transmission route of the packet through the networks in a more efficient manner. For example, the first AS network may include an Autonomous System Border Router (ASBR) device or similar edge device communicating with an ASBR or similar device in the second AS network. The ASBR of the first AS network and/or the ASBR of the second AS network may be configured to route a packet based on an IP routing table, rather than through traditional label routing protocols. Through this IP table routing of the packet, a more efficient routing through the stitched AS networks may occur.

In one particular embodiment, one or more of the ASBR devices may announce a null or zero label to upstream network devices for purposes of label routing through the networks. Thus, in one embodiment, the ASBR of the second AS network may announce a null or zero label to the ASBR of the first AS network. When the ASBR of the first network receives a packet for a particular destination from the second network, the ASBR may strip off an attached label of the packet and insert a null or zero label before transmitting the packet to the ASBR of the second network. The ASBR of the second network may, in turn, be configured to conduct an IP routing table lookup for packets that arrive with a null or zero routing label. Through the IP routing table lookup, the communication packet may be routed to a more efficient egress edge device of the second AS network and then to the destination, which may be another network to which an end device is reachable, an end device itself, or otherwise.

In a similar manner, the ASBR of the first AS network may also announce a null or zero label for packets intended for the second AS network or any other network or device to which the ASBR of the first network is connected. The ASBR of the first network may also be similarly configured to perform IP routing table lookups for packets received with a null or zero routing label and, based on the IP routing table lookup, route the received communication packet to a particular ASBR of the second network or to a third AS network connected to the ASBR of the first network. In this manner, the ASBR of the first AS network may also route the packet based on the IP routing table to further improve the efficiency of the routing of the packets through the AS networks. This IP table routing may occur within an established LSP route through the AS networks without disrupting the LSP routing performed by other networks along the transmission path. In general, any component along the LSP route through the AS networks may perform the IP table routing to improve the effectiveness and/or efficiency of the operation of the telecommunication network.

Beginning in FIG. 1, one example of a typical telecommunications network configuration is shown. In particular, FIG. 1 is a schematic diagram illustrating an exemplary network operating environment 100 in accordance with one embodiment. In general, the environment 100 provides for establishing communication sessions between network devices and for providing one or more network services. With specific reference to FIG. 1, the environment 100 includes a primary network 102, which may be provided by a wholesale network service provider. Portions of the network 102 may include either of IP-based or non IP-based routing. For example, network 102 may include devices utilizing time division multiplexing (TDM) or plain old telephone service (POTS) switching, albeit those aspects of the network are not relevant to this disclosure except to the extent that traffic may be converted to some form of IP based traffic The primary network 102 includes numerous components such as, but not limited to gateways, routers, and registrars, which enable communication and/or provide services across the primary network 102, but are not shown or described in detail here because those skilled in the art will readily understand these components.

The primary network 102 may be configured to interconnect multiple secondary networks, such as customer network 106 which can include communication devices such as, but not limited to, a personal computer 110 connected to a router/firewall 114. Although shown in FIG. 1 as computer 110, the communication devices may include any type of communication device that receives a multimedia signal, such as an audio, video or web-based signal, and presents that signal for use by a user of the communication device. For example, a VoIP telephone or VoIP enabled device may be used to facilitate communication through the network 102 with the public switched telephone network (PSTN). The communication and networking components of the customer network 106 enable a user at the customer network 106 to communicate through network 102 to other communication devices, such as the PSTN 126, the Internet 142, and/or other customer networks. Components of the customer network 106 are typically home- or business-based, but they can be relocated and may be designed for easy portability. For example, the communication device 110 may be a wireless (e.g., cellular) telephone, smart phone, tablet or portable laptop computer. In some embodiments, multiple communication devices in diverse locations that are owned or operated by a particular entity or customer may be connected through the network 102.

The customer network 106 typically connects to the network 102 via a border network 122, such as one provided by an Internet Service Provider (ISP). The border network 122 is typically provided and maintained by a business or organization such as a local telephone company or cable company. The border network 122 may provide network/communication-related services to their customers. In contrast, the communication device 120 accesses, and is accessed by, the network 102 via a public switched telephone network (PSTN) 126 operated by a local exchange carrier (LEC). Communication via any of the networks can be wired, wireless, or any combination thereof. Additionally, the border network 122 and PSTN 126 may communicate, in some embodiments, with the network 102 through respective provider edges 130,132. For ease of instruction, only three communication devices 110, 115, 120 are shown communicating with the network 102; however, numerous such devices, and other devices, may be connected with the network 102, which is equipped to handle enormous numbers of simultaneous communications.

An operator of the network 102 may configure the network in any manner to facilitate the routing of communications through the network. For example, the network 102 may include a series of interconnected networking devices, such as routers and switches, that receive a communication, analyze the communication to determine a destination, and route the communication to a connected networking device to get the communication closer to a destination or egress point (such as provider edge 131). To determine which routes through the network to utilize to route a received communication or packet, components of the network may receive route information through one or more route announcing sessions between the devices. These route announcing sessions provide Layer 3 routing information between the components of the network and between different networks so that components of the telecommunications network 102 and other networks may determine how to route received communication packets.

One particular example of the announcement of Layer 3 routing information occurs in a Border Gateway Protocol (BGP) announcement. In general, BGP information (or BGP session, BGP feed or BGP data) is a table of Internet Protocol (IP) prefixes which designate network connectivity between autonomous systems (AS) or separate networks. BGP information for a network route may include path (including next-hop information), network policies, and/or rule-sets for transmission along the path, among other information. The BGP feed may also include Interior Gateway Protocol (IGP) information for network routes within an Autonomous System (AS) or network and/or other network information that pertains to the transmission of content from the network. However, BGP information mainly describes routes used by the network 102 to connect to external networks or customers (such as border network 122 and virtual cloud environment 142) while IGP information describes routes through the network to connect one provider edge (such as provider edge 132) to another provider edge (such as provider edge 131) through a telecommunications network 102.

The network 102 is provided as an example to illustrate various aspects of telecommunications relevant to the present disclosure. Implementations of the present disclosure are not limited to the specific implementation illustrated in FIG. 1. Rather, the concepts discussed herein are more generally applicable to exchanging and routing data through a telecommunications network between endpoints of the telecommunications network.

Figure 2:
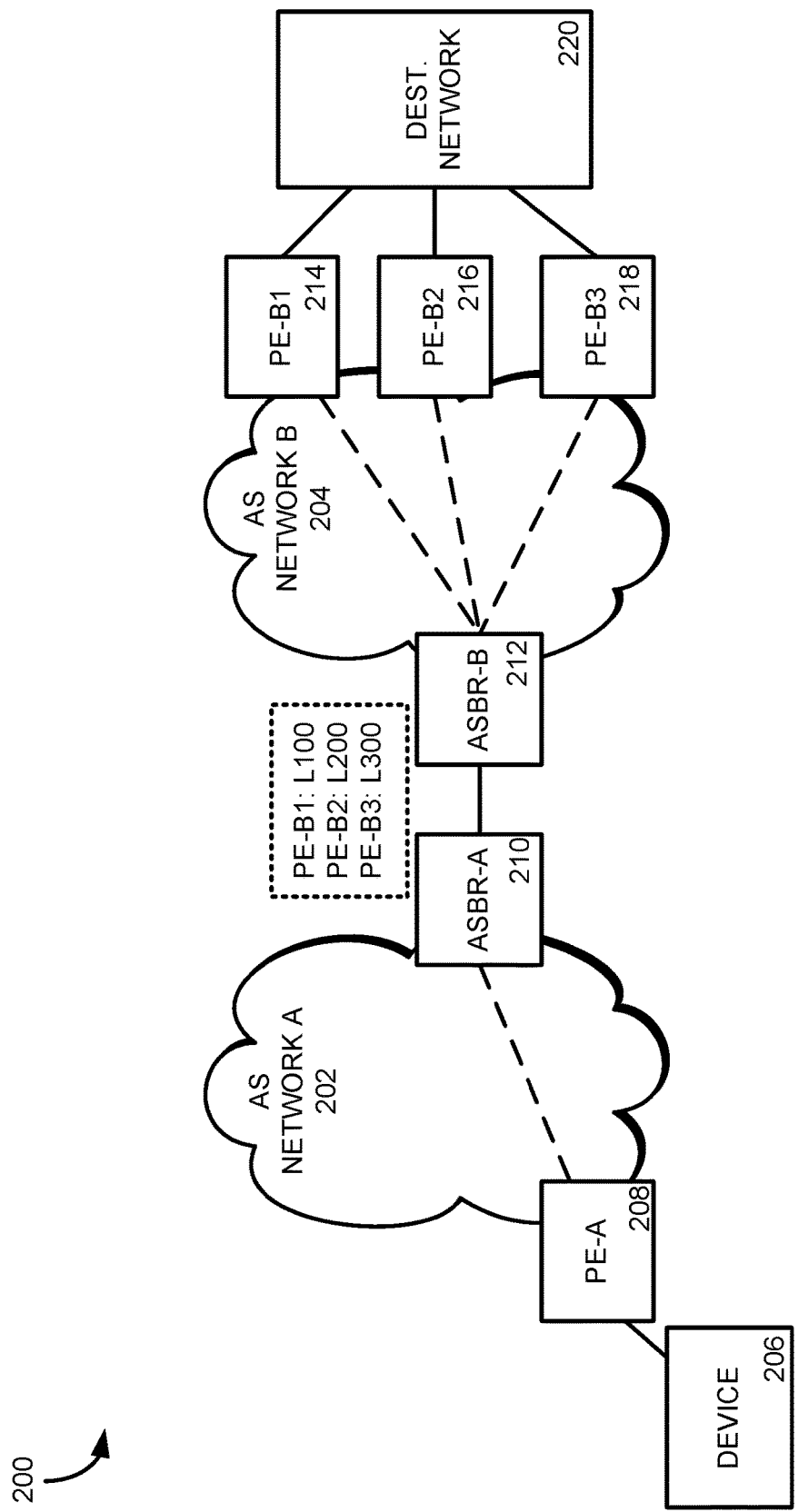
FIG. 2 is a schematic diagram illustrating a first network environment for routing communications between two or more Autonomous System (AS) networks utilizing a Label-Switched Path (LSP).

In one instance, the telecommunications network 102 may include more than one Autonomous System (AS) network. For example, a telecommunications company or administrator of a first AS network may acquire an additional AS network through a merger with another telecommunications company or administrator. Rather than integrating the two AS networks into a single AS network, it may be more cost effective to stitch the two AS networks together through one or more network devices. In particular, FIG. 2 is a schematic diagram illustrating a first network environment for routing communications between two or more AS networks utilizing a Label-Switched Path (LSP) and conventional stitching methods. At a high level, the network 200 of FIG. 2 may operate the same as that of the telecommunications network 100 discussed above with reference to FIG. 1 in that the network 200 may allow a communication device or network 206 to communicate with a destination device or network 220 through the stitched AS networks.

As shown in the network environment 200 of FIG. 2, a first AS network ("AS network A") 202 is stitched to a second AS network ("AS network B") 204 through a first Autonomous System Border Router (ASBR) ("ASBR-A") 210 of the first AS 202 connected to a second ASBR ("ASBR-B") 212 of the second AS network 204. It should be appreciated that the two ASBR devices 210, 212 may not be directly connected to each other, but may instead be connected through any number of additional networking devices. Thus, the ASBR devices 210, 212 provide a communication bridge between AS network A 202 and AS network B 204 for transmission of communication packets in either direction between the AS networks 202, 204. Although only one ASBR device 210, 212 is shown per AS network 202, 204, it should be appreciated that any number of ASBR devices may be utilized to stitch the AS networks together, as discussed in more detail below with reference to FIG. 4.

Also similar to the telecommunications network 100 above, each AS network 202, 204 of the network environment 200 of FIG. 2 may include any number of edge devices. For example, AS network A 202 may include one or more edge devices, such as edge device PE-A 208, which receives communications transmitted from the customer network 206. Other edge devices may also be included in AS network A 202. Similarly, AS network B 204 may include edge devices, such as edge device PE-B1 214, edge device PE-B2 216 and edge device PE-B3 218. As above, AS network B 204 may include other edge devices not illustrated in the network environment 200 of FIG. 2.

One particular example transmission route for a packet through network environment 200 is now discussed. In this example, the device 206 transmits a communication packet, intended for destination network 220 (or device 220), to edge device PE-A 208, which, for this example is further considered and referred to as the ingress device. The packet is then routed from the ingress device PE-A 208 through AS network A 202 to ASBR-A 210, which routes the packet to ASBR-B 212 of AS network B 204. The packet is then routed from ASBR-B 212 through AS network B 204 to one of edge devices PE-B1 214, PE-B2 216, or PE-B3 218 which, for this example, are further considered and referred to as egress devices. As illustrated, each of the egress edge devices 214-218 is in communication with the destination network 220 such that the egress edge device that ultimately receives the packet can route the packet to the destination network 220, which may be delivered to a destination device.

The transmission route through the AS networks 202, 204 is configured as a Label-Switched Path (LSP). In particular, the networks 202, 204 may be configured as a Multiprotocol Label Switching (MPLS)-type routing network that utilizes labels for routing packets through the networks along LSPs. In this configuration, each network component along a transmission route announces a particular label that an upstream networking device should apply to a communication packet to reach a particular destination network or device. For example, ASBR-B 212 may announce to ASBR-A 210 to apply specific labels to a received packet to route the packet to PE-B1 214, PE-B2 216, or PE-B3 218. As shown in this example, ASBR-B 212 instructs ASBR-A 210 to utilize label "100" for egress device PE-B1 214, label "200" for egress device PE-B2 216, and label "300" for egress device PE-B3 218. Similar announcements may occur from every network device along the transmission route from ingress PE-A 208 to egress PE-B1 214 through PE-B3 218. Accordingly, as the packet is transmitted between network devices, each device "pops" or removes the current label from the packet and applies the necessary label for routing the packet to its ultimate destination before forwarding the packet on to the next device in the LSP.

One particular issue with routing a packet along an LSP through the AS networks 202, 204 results from some network devices being unaware of some aspect of the network topology. For example, ingress device PE-A 208 may receive some routing information from devices of AS network B 204, such as which edge devices 214-218 provide access to particular destination networks (such as destination network 220) or devices. However, PE-A 208 may not be aware of a geographic location of the egress edge devices 214-218. Thus, when PE-A 208 receives a packet from device 206, PE-A 208 may select one of the egress devices 214—from AS network B 204 to reach destination network 220 and apply a label to the packet for routing to the selected egress device. Through the stripping and application of labels to the packet, the packet is routed through the devices of AS network A 202 and AS network B 204 to the selected egress device 218. In general, however, routing of communication packets through networks is most efficient or cost-effective by minimizing the distance the packets are transmitted, the number of hops taken by the packets, and egressing from a device logically or geographically proximate the destination, or from an egress otherwise selected or optimized for egress to the destination. Thus, if a packet is received at an ingress device 208 in New York, providing that packet to a destination network 220 through a New York egress device 214 is a type of cost-effective operation of the telecommunications network 200. As such, creating transmission routes through the networks without knowledge of geographic locations of the components of the route may introduce inefficiencies or costs into the operation of the network 200.

In one particular example, assume that the customer packet is received at PE-A 208 located in New York. Further, ASBR-A 210 and ASBR-B 212 may also be located in New York. However, destination network 220 may connect to AS network B 204 in three different geographic locations, such as in New York through PE-B1 214, in San Francisco through PE-B2 216, and in Tokyo through PE-B3 218. To operate the network 200 in a cost-effective manner, a packet received at PE-A 208 in New York should be provided to destination network 220 through PE-B1 214 also located in New York. However, because PE-A 208 may not have network topology and geographic information of the components of AS network B 204, the packet may be routed through San Francisco (PE-B2 216) or Tokyo (PE-B3 218) in an inefficient manner.

Figure 3:
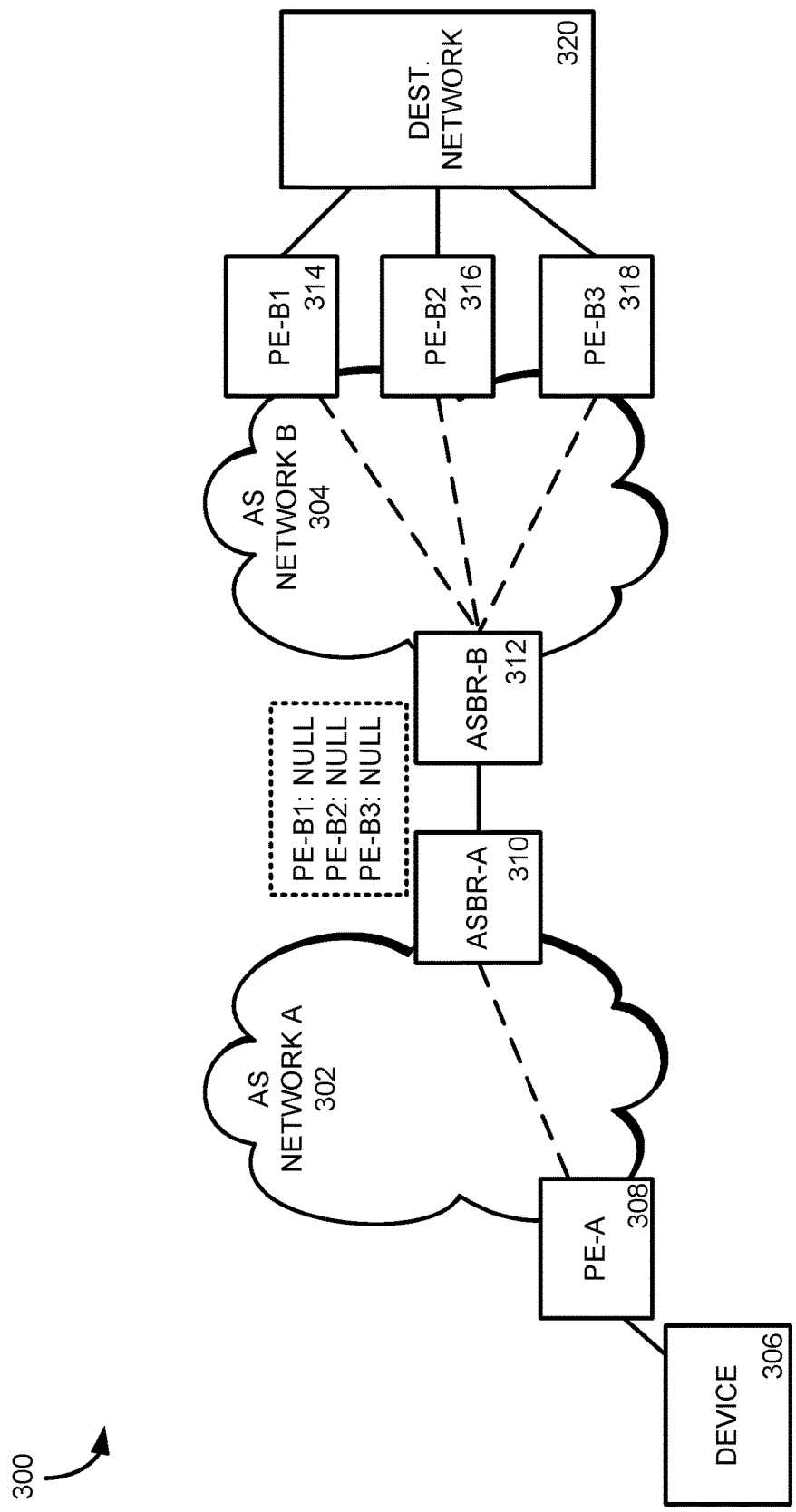
FIG. 3 is a schematic diagram illustrating a second network environment for utilizing Internet Protocol (IP) routing within a LSP stitched across two AS networks.

To address this inefficiency and/or other inefficiencies of the stitching implementation illustrated in FIG. 2, FIG. 3 is a schematic diagram illustrating a second network environment 300 for routing communications between two or more AS networks utilizing a Label-Switched Path (LSP) in which Internet Protocol (IP) is implemented to route traffic along an LSP stitched across two AS networks 302, 304. In general, the network configuration 300 of FIG. 3 is the same or similar to the network configuration 200 of FIG. 2 discussed above. Thus, components of the network environment 300 may include similar numbering as the network environment 200 of FIG. 2. In this embodiment, however, one or more of the network components along the LSP through the AS networks 302, 304 may utilize a null value or zero value in a routing label to use a IP routing table to route a received communication packet.

For example, in the network environment 300 of FIG. 3, ASBR-B 312 announces particular labels to ASBR-A 310 to reach egress devices PE-B1 314, PE-B2 316, and PE-B3 318 of AS network B 304. In the embodiment illustrated in FIG. 3, ASBR-B 312 may be configured to instead announce a null value or zero value in a routing label to reach those egress devices (i.e., PE-B1 314, PE-B2 316, and PE-B3 318). In other words, in this implementation ASBR-B 312 of AS network B 304 instructs ASBR-A 310 of AS network A 302 to insert a null value or zero value into the label routing portion of a received packet if the destination packet is intended for egress edge devices PE-B1 314, PE-B2 316, or PE-B3 318. In general, however, ASBR-B 312 may be configured to announce any label value for use by ASBR-A 310 in routing packets for the particular egress devices that ASBR-B is configured to perform an IP table look-up routing for the received communication packet, as described in more detail below. Although the use of a null value is discussed throughout this description, it should be appreciated that any label value, including a zero value, may similarly be utilized to execute the IP routing of a packet as described herein. Accordingly, ASBR-A 310 more generally applies some predetermined label value for signaling to ASBR-B 312 that ASBR-B 312 should conduct IP routing for the packet.

Upon receiving a communication packet along the LSP from PE-A 308 of AS network A 302 intended for a selected egress device (such as PE-B3 318) of AS network B 304 to reach a destination network 320 (or destination network device), ASBR-A 310 may remove the routing label from the packet and insert the null value routing label into the packet. With the null value label inserted into the label portion of the packet, ASBR-A 310 transmits the packet to ASBR-B 312 of AS network B 304. ASBR-B 312 may then be configured to obtain the null value routing label from the packet and disregard the null label. A similar approach at ASBR-B 312 may be executed for other label routing values, such as a zero value label or some other predetermined label value that signals to ASBR-B 312 that ASBR-B 312 is to perform IP routing for the packet. In implementations in which a null routing label is inserted by ASBR-A 310, the packet is effectively converted from a labeled packet to an IP communication packet. Alternatively, in implementations in which the labeled packet includes some other predetermined signaling value, ASBR-B 312 may identify the predetermined value and handle the packet as if it was an IP communication packet.

ASBR-B 312 may be configured to route received IP packets based on a stored Internet or IP-based routing table. The IP packet may include a destination IP address identifying the destination network 320 and the IP routing table of ASBR-B 312 may include IGP and/or BGP routing information that informs ASBR-B that destination network may be accessed through egress devices PE-B1 314, PE-B2 316, and PE-B3 318. Further, the IP routing table may have more information of the geographical location of components of AS network B 304, such as the geographical location of PE-B1 314, PE-B2 316, and PE-B3 318 that may be further used in determining how to route the packet. Thus, through the use of the IP routing table, ASBR-B 312 may select the most efficient or cost-effective egress device to transmit the received packet to destination network 320. For example, if ASBR-B 312 is located in New York, egress device PE-B1 314 which, in this example, is also located in New York, may be the most efficient egress device from AS network B 304 to destination network 320. ASBR-B 312 may then select the most efficient egress device 314 for providing the packet to the destination 320 regardless of the egress device from network B 304 that may have been selected by ingress device PE-A 308 of AS network A 302 and route the packet through AS network B 304 accordingly. In one particular implementation, ASBR-B 312 may apply a routing label to the packet to continue label routing along the LSP to PE-B1 314. Thus, the IP routing table look-up may only occur at ASBR-B 312, with the rest of the routing of the packet based on label routing techniques along the LSP through the networks 302, 304.

In this manner, the network 300 may utilizing IP routing within a LSP stitched across two or more AS networks. This may act to make the routing of packets through the two networks more efficient. For example, a packet may be received from device 306 at PE-A 308 for delivery to the destination network 320. PE-A 308 may have routing information from AS network B 304 that indicates any of egress devices PE-B1 314, PE-B2 316, and PE-B3 318 may reach the destination network 320 from AS network B 304. However, PE-A 308 may not be aware of certain information about the egress devices 314-318, such as estimated geographic locations of the devices. Thus, PE-A 308 may select a sub-optimal egress device through which the packet may be routed to the destination network 320. For example, PE-B1 314, PE-B2 316, and PE-B3 318 may be located in New York, San Francisco, and Tokyo, respectively and the destination network 320 may also be located in New York. Although the packet may technically reach the destination network 320 through any of the egress devices 314-318, routing the packet through AS network B 304 to Tokyo through PE-B3 318 to reach the destination network 320 in New York when a local egress point (i.e., PE-B1 314) is available may exact an unnecessary transmission cost for routing the packet.

By utilizing the null label value (or similar predetermined label value) when transmitting data between AS network A 302 and AS network B 305, as previously discussed, an IP table look-up may occur to correct or otherwise select a more efficient path through the AS networks 302, 304 to the most suitable egress device. Thus, in this implementation, ASBR-A 310 attaches a null value routing label to the packet and transmits the packet to ASBR-B 312. ASBR-B 312 removes the null label value and obtains the IP packet routing information. With this information, ASBR-B 312 utilizes an IP routing table to determine the route through AS network B 304 for the received packet. The IP routing table may include certain network topology information such that the selection of one of the egress devices 314-318 of AS network B 304 may be more efficient than the egress device identified and selected by PE-A 308. For example, using the previous example, ASBR-B 312 may determine that PE-B1 312 in New York is the most efficient egress device to reach the destination network 320 even if PE-B3 318 in Tokyo was originally identified by PE-A 308 when the packet was received from device 306. Accordingly, a more efficient route through AS networks 302, 304 may be selected and the packet may be routed along the more efficient path. ASBR-B 312 may then apply a corresponding routing label in the packet to reach PE-B1 314 for routing to destination network 320.

Figure 4:
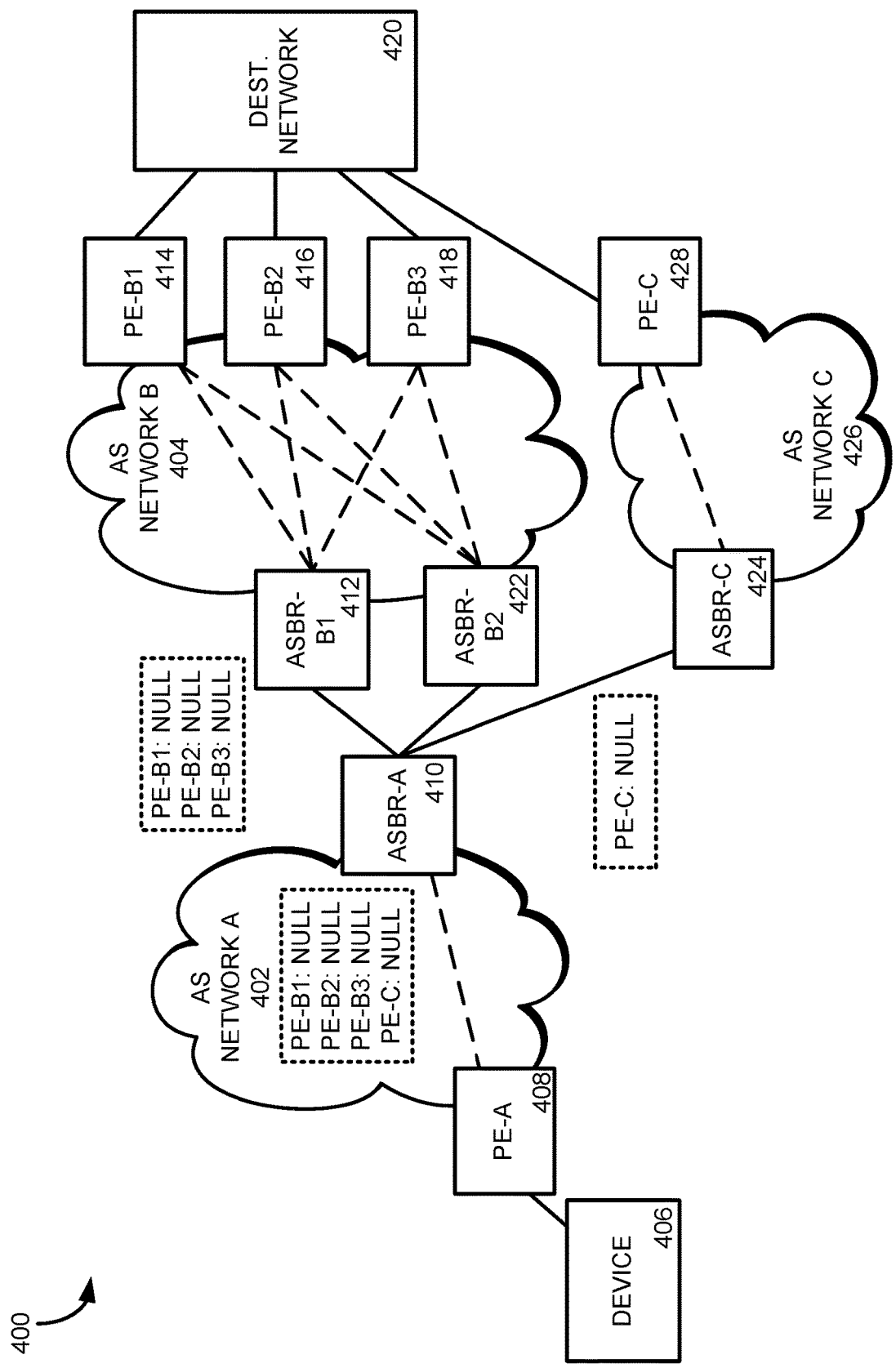
FIG. 4 is a schematic diagram illustrating a third network environment for utilizing IP routing within a LSP stitched across three or more AS networks.

Although described above as ASBR-B 312 utilizing an IP routing table along the LSP, it should be appreciated that any device of the LSP through AS network A 302 or AS network B 304 may be configured to announce a null or zero label routing value and route a received packet with that label value through an IP routing table. For example, FIG. 4 is a schematic diagram illustrating a third network environment 400 for utilizing IP routing within a Label-Switched Path (LSP) stitched across three or more AS networks. In general, the network configuration 400 of FIG. 4 is the same or similar to the network configurations 200, 300 discussed above. Thus, components of the network environment 400 may include similar numbering as the network environments 200, 300 above. In this embodiment, however, an additional AS network (AS network C 426) is included and more than one of the network components along the LSP through the AS networks 402, 404, 426 may utilize a null value, zero value, or similar predetermined value in a routing label to use an IP routing table to route a received communication packet.

In the particular implementation illustrated in FIG. 4, ASBR-A 410 may be connected to or otherwise in communication with two border routers of AS network B 404, namely ASBR-B1 412 and ASBR-B2 422. Further, ASBR-A 410 may be in communication with a border router (ASBR-C 424) of a third AS network (AS network C 426). AS network C 426 may also include an egress edge device (PE-C 428) through which destination network 420 may be reached. In this implementation, each of ASBR-B1 412 and ASBR-B2 422 may announce a null label value for reaching egress devices PE-B1 414, PE-B2 416, and PE-B3 418 to ASBR-A 410 as described above. Similarly, ASBR-C 424 may announce a null label value for reaching egress device PE-C 428 to ASBR-A 410. As also described above, the label value announced by the ASBR devices may be any value for use in utilizing an IP routing table to route a received packet.

In addition to the ASBR devices 412, 422 of AS network B 404 and the ASBR device 424 of AS network C 426 announcing a null label routing value, ASBR-A 410 may also announce into AS network A 402 similar null label routing values. For example, one or more networking devices of AS network A 402 may be in communication with the ASBR-A 410, referred to herein as neighboring devices. These neighboring devices, similar to other network devices along the LSP, receive label routing announcements from the ASBR-A 410 for use in label routing received communications to ASBR-A. Similar to that described above, the neighboring devices to ASBR-A 410 remove a label value from a received packet intended for ASBR-A 410 and replace the label value with a null, zero, or other predetermined value and transmit the packet with the null label value to ASBR-A 410 for further routing.

For example, assume a device 406 transmits a communication packet to PE-A 408 to be delivered to destination network 420. As explained above, PE-A 408 may select an egress device for the packet from PE-B1 414, PE-B2 416, and PE-B3 418 of AS network B 404 and PE-C 428 of AS network C 426. With the egress device selected, PE-A 408 applies a routing label to the communication and transmits the packet through AS network A 402. A neighboring device to ASBR-A 410 receives the packet and, as described, removes the label value from the packet and based on the announced null label values for the egress devices, applies the null value label to the packet for transmission to ASBR-A. ASBR-A 410, in turn, removes the null label value to obtain the IP packet of the communication. The ASBR-A 410 may be configured to route IP packets based on a stored Internet or other IP-based routing table which may include network topology information, such as estimated geographic locations of egress devices from AS network B 404 and AS network C 426. ASBR-A 410 may select to route the communication to ASBR-B1 412 or ASBR-B2 422 for egress devices to destination network 420 in AS network B 404, or may select to route the communication to ASBR-C 424 for egress devices to destination network in AS network C 426. In one implementation, the selection of the transmission route for the packet may be based on the network topology information contained in or accessible by the IP routing table of ASBR-A 410. Because the selected route from ASBR-A 410 is based on network topology information, such a route may be more cost-effective for the network 300.

In addition, in some cases the IP routing table of ASBR-A 410 may have some network topology information for AS network B 404 and AS network C 426 and another IP table look-up may be performed by other network devices along the LSP route. For example, ASBR-B1 412, ASBR-B2 422, and ASBR-C 424 may also announce and receive packets with a null or other predetermined label value. Through the same operations as above, the ASBR devices may remove the null label value from the packet and utilize an IP routing table to select an egress device to the destination network 420. The routing tables for the ASBR devices 412, 422 of AS network B 404 may include additional network topology information of AS network B that ASBR-A 410 may not have. Similarly, routing tables for ASBR-C 424 of AS network C 426 may include additional network topology information of AS network C that ASBR-A 410 may not have. Thus, by consulting the IP routing tables at the ingress ASBR devices for AS network B 404 and AS network C 426, a more efficient route through the respective AS networks may be selected for transmitting the received packet. In this manner, any number and type of networking devices along an LSP through multiple AS networks may be configured to announce a predetermined label value for certain destination or edge devices and utilize the predetermined value to route a received packet based on an IP routing table within the LSP through the stitched AS networks.

Figure 5:
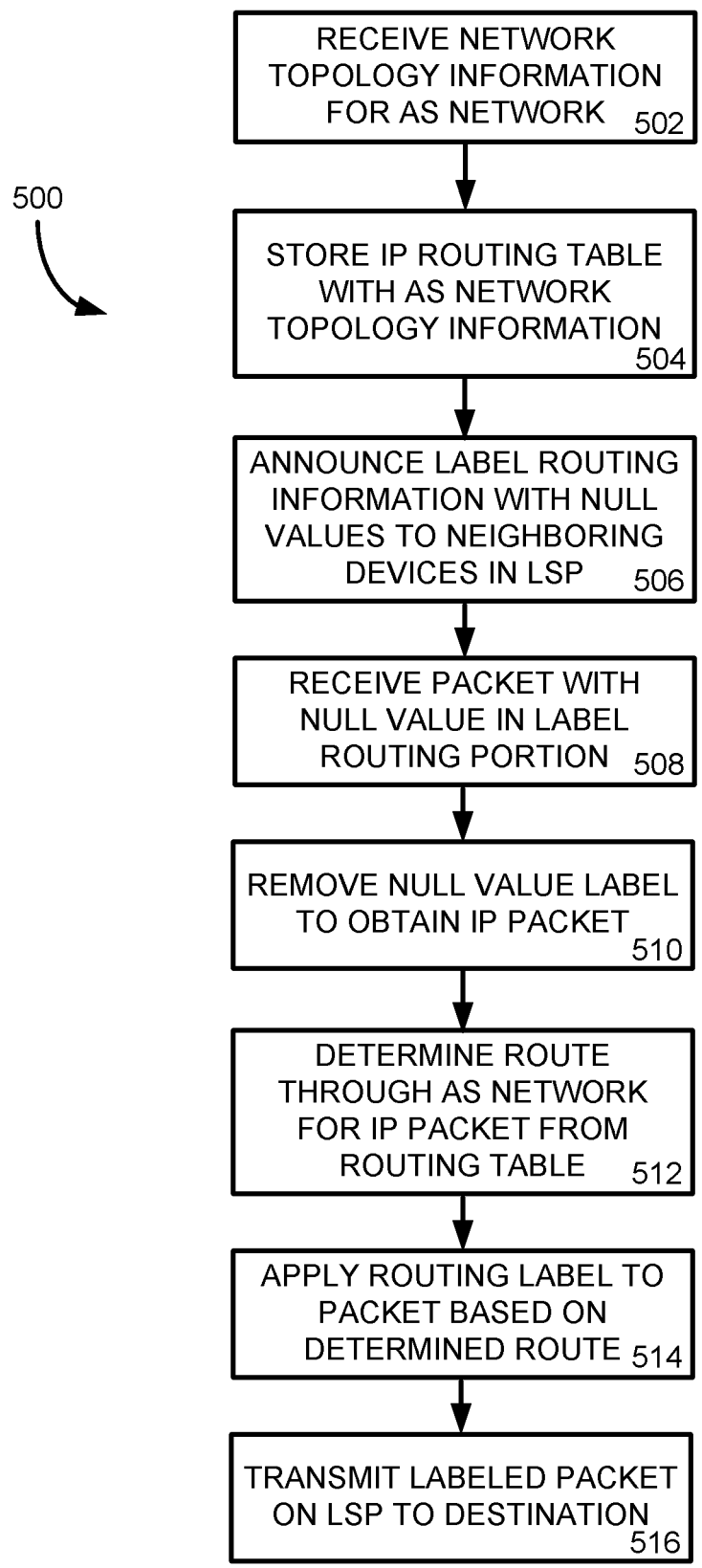
FIG. 5 is flowchart illustrating a method for utilizing IP routing within a LSP stitched across two AS networks.

FIG. 5 is flowchart illustrating a method for utilizing IP routing within an LSP stitched across two AS networks. In general, the operation of the method 500 of FIG. 5 may be performed by any networking component of a telecommunications network, such as an ASBR device of an AS network stitched to another AS network through the ASBR. Through the method 500, routing based on an IP routing table may be performed within an otherwise label-based routing path to address inefficiencies within the selected route through the stitched AS networks.

Beginning in operation 502, the ASBR receives network topology information for the AS network of which the ASBR is a part. This network topology information may include, for example, estimated geographic locations of devices of the AS network and/or logical positions within the AS network for the devices. In operation 504, the ASBR may then store or generate an IP routing table for the AS network (and other connected AS networks or devices) that includes some or all of the received network topology information. This IP routing table may then be utilized to route received IP communication packets, as described in more detail below.

In operation 506, the ASBR may announce label routing information for one or more paths through the AS network to neighboring (or upstream) network devices. Such announced label routing information may include the use of null value labels, zero value labels, or any other label value for routing in an MPLS network configuration for any number of transmission paths through the AS network. In one particular implementation, the ASBR of the AS network announces the null value label for one or more transmission paths, egress devices, or destination networks to an ASBR of another AS network stitched to the first AS network. In operation 508, the ASBR receives a communication packet with the null value in the label routing portion of the packet and, in operation 510, removes the null value from the label portion of the packet to obtain the IP packet information for the communication. The IP routing information may include a destination IP address (or other destination indicator) along with other typical IP routing information.

With the IP packet for the communication obtained, the ASBR may utilize the IP routing table from above to determine or select a transmission path through the AS network in operation 512. Further, because the IP routing table may include the network topology information for the AS network, the determined route may be more efficient or cost-effective than a route selected without the network topology information. With the route determined, the ASBR may apply a routing label to the communication packet based on the determined route for transmission along the LSP through the stitched AS networks in operation 514. In operation 516, the ASBR may then transmit the communication packet to the next network device along the LSP based on the applied label toward the destination network for the communication. In this manner, routing of a communication based on an IP routing table may be performed within an otherwise label-based routing path to address inefficiencies within the selected route through the stitched AS networks.

The foregoing examples of systems and methods for routing traffic through stitched AS networks considered geographic location as the primary factor determining routing. However, implementations of the present disclosure are not limited to relying on geographic location to make routing decisions. Rather, any suitable parameter or characteristic may be relied upon to facilitate routing decisions. For example and without limitation, available bandwidth, network status, particular services purchased by a customer, and similar operational parameters may also be considered when making routing decisions.

Figure 6:
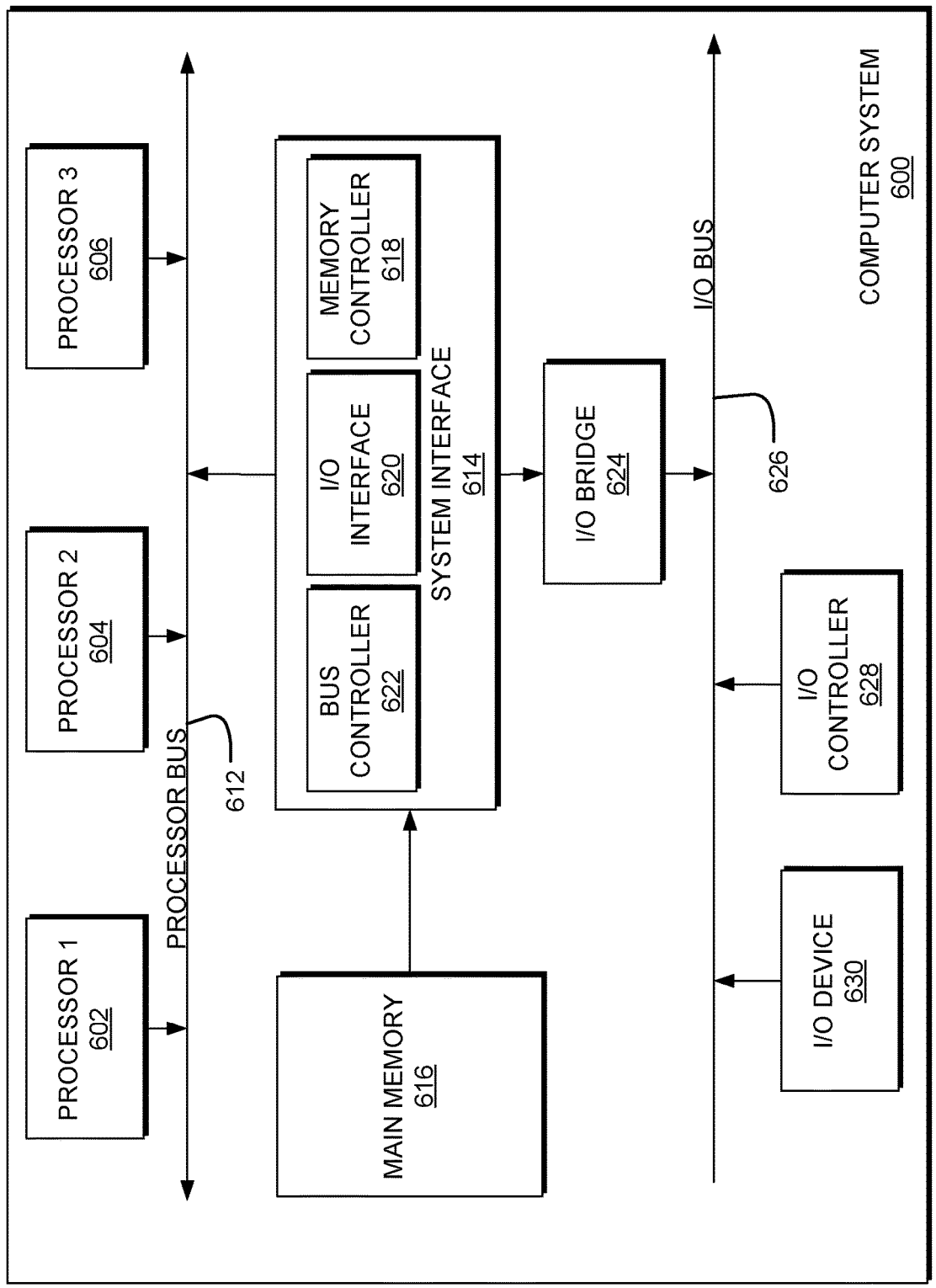
FIG. 6 is a diagram illustrating an example of a computing system which may be used in implementing embodiments of the present disclosure.

FIG. 6 is a block diagram illustrating an example of a computing device or computer system 600 which may be used in implementing the embodiments of the components of the network disclosed above. For example, the computing system 600 of FIG. 6 may be the virtual router of the bridge discussed above. The computer system (system) includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. System interface 614 may be connected to the processor bus 612 to interface other components of the system 600 with the processor bus 612. For example, system interface 614 may include a memory controller 618 for interfacing a main memory 616 with the processor bus 612. The main memory 616 typically includes one or more memory cards and a control circuit (not shown). System interface 614 may also include an input/output (I/O) interface 620 to interface one or more I/O bridges or I/O devices with the processor bus 612. One or more I/O controllers and/or I/O devices may be connected with the I/O bus 626, such as I/O controller 628 and I/O device 630, as illustrated. The system interface 614 may further include a bus controller 622 to interact with processor bus 612 and/or I/O bus 626.

I/O device 630 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system set forth in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 616. Common forms of machine-readable medium may include, but is not limited to, magnetic storage medium; optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages should be understood by the foregoing description, and it should be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

I claim:

1. A method of routing traffic through a network, the method comprising:
receiving, at a routing device of an autonomous system (AS), a communication packet including a label value associated with a destination network device;
replacing the label value associated with the destination network device in the communication packet with a predetermined label value; and transmitting the communication packet with the predetermined label value to an autonomous system border router (ASBR) in communication with the routing device,
wherein the predetermined label value is selected to cause the ASBR to perform a routing lookup to route the communication packet based on a result of the routing lookup.

2. The method of claim 1, wherein the predetermined label value is one of a null value and a zero value.

3. The method of claim 1, wherein the routing device of the AS is an egress ASBR of a first AS and the ASBR in communication with the routing device is an ingress ASBR of a second AS.

4. The method of claim 1, wherein the routing device is one of an edge device and a device within the AS and the ASBR in communication with the routing device is an egress ASBR of the AS.

5. The method of claim 1, further comprising receiving, at the routing device, the predetermined label value from the ASBR in response to the ASBR announcing the predetermined label value.

6. The method of claim 1, wherein replacing the label value associated with the destination network device with the predetermined label value converts the communication packet from a label-routed communication packet to an IP-routed communication packet.

7. A method of routing traffic through a network, the method comprising:
receiving a communication packet at an autonomous system border router (ASBR) of an autonomous system (AS), the communication packet including a predetermined label value, wherein the predetermined label value replaced a prior label value associated with the destination network device in the communication packet;
in response to the ASBR identifying the predetermined label value, performing a routing lookup using a routing table of the ASBR to identify a next hop for routing of the communication packet; and
routing the communication packet to a network device corresponding to the next hop.

8. The method of claim 7, wherein the network device corresponding to the next hop is one of the destination network device or a network device along a routing path between the ASBR and the destination network device.

9. The method of claim 8, wherein the ASBR is an egress ASBR of a first AS and the network device corresponding to the next hop is an ingress ASBR of a second AS.

10. The method of claim 8, wherein the ASBR is an ingress ASBR of the AS and the destination network device is outside the AS.

11. The method of claim 10, wherein the network device corresponding to the next hop is along a routing path between the ASBR and the destination network, the method further comprising routing the communication packet to an edge device of the AS.

12. The method of claim 11, wherein routing the communication packet to the edge device of the AS comprises replacing the predetermined label value with a label routing value of a Label-Switched Path (LSP) between the ASBR and the edge device.

13. The method of claim 7, further comprising announcing, by the ASBR, the predetermined label value to a device in communication with the ASBR.

14. A system for routing traffic through a network, the system comprising:
a network device of a first autonomous system (AS); and
an ingress autonomous system border router (ASBR) of a second AS in communication with the network device;
wherein the network device is configured to:
receive a communication packet including a first label value; and
replace the first label value in the communication packet with a predetermined label value, and
wherein the ingress ASBR is configured to:
in response to receiving the communication packet having the predetermined label value, perform an ingress ASBR routing lookup using a routing table of the ingress ASBR to identify an edge device of the network; and
replace the predetermined label with a second label value associated with the edge device.

15. The system of claim 14, wherein the predetermined label value is one of a null value and a zero value.

16. The system of claim 14, wherein the ingress ASBR is further configured to announce the predetermined value to the network device.

17. The system of claim 14, wherein the network device is an egress ASBR of the first AS.

18. The system of claim 14 further comprising an egress ASBR of the first AS in communication with each of the network device and the ingress ASBR of the second AS.

19. The system of claim 18, wherein the egress ASBR is configured to:
in response to receiving the communication packet with the predetermined label value, perform an egress ASBR routing lookup using the IP routing information and a routing table of the egress ASBR; and
forward the communication packet with the predetermined label value according to the result of the egress ASBR routing lookup.

20. The system of claim 18, wherein the egress ASBR is configured to announce the predetermined label value to the network device.

* * * * *